United States Patent
Huang et al.

(10) Patent No.: US 11,328,600 B2
(45) Date of Patent: May 10, 2022

(54) METHOD AND APPARATUS FOR IDENTIFYING TRAFFIC ACCIDENT, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Jizhou Huang, Beijing (CN); Haifeng Wang, Beijing (CN); Hao Zhang, Beijing (CN); Miao Fan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/951,922

(22) Filed: Nov. 18, 2020

(65) Prior Publication Data

US 2021/0398427 A1    Dec. 23, 2021

(30) Foreign Application Priority Data

Jun. 23, 2020    (CN) .......................... 202010583070.X

(51) Int. Cl.
*G08G 1/16* (2006.01)
*G08G 1/01* (2006.01)
(Continued)

(52) U.S. Cl.
CPC ........... *G08G 1/164* (2013.01); *G08G 1/0133* (2013.01); *G08G 1/0137* (2013.01); *G08G 1/048* (2013.01); *G08G 1/052* (2013.01)

(58) Field of Classification Search
CPC .... G08G 1/164; G08G 1/0133; G08G 1/0137; G08G 1/048; G08G 1/052
See application file for complete search history.

(56) References Cited

U.S. PATENT DOCUMENTS 10,223,910 B2    3/2019    Ko et al.
2017/0278386 A1    9/2017    Ko et al.
(Continued)

FOREIGN PATENT DOCUMENTS

CN    102496280 A    6/2012
CN    103646534 B    12/2015
(Continued)

OTHER PUBLICATIONS

Second Office Action and search report from CN app. No. 202010583070.X, dated Jun. 16, 2021, with English translation provided by Global Dossier.
(Continued)

*Primary Examiner* — Daryl C Pope
(74) *Attorney, Agent, or Firm* — Ladas & Parry, LLP

(57) ABSTRACT

A method and apparatus for identifying a traffic accident, a device and a computer storage medium are disclosed, which relates to the technical fields of intelligent traffic and big data. An implementation includes: acquiring road features, environmental features and road traffic stream features; inputting the road features, the environmental features and the road traffic stream features into a pre-trained traffic-accident identifying model to obtain an accident-information identifying result of a road which at least includes an accident identifying result. In the present application, the accident road may be automatically identified according to the road features, the environmental features and the road traffic stream features. Compared with a traditional manual reporting way, timeliness is stronger, and a coverage rate is higher.

16 Claims, 7 Drawing Sheets

(51) Int. Cl.
    *G08G 1/048*     (2006.01)
    *G08G 1/052*     (2006.01)

(56) References Cited

U.S. PATENT DOCUMENTS

| | | | | |
|---|---|---|---|---|
| 2019/0147737 A1* | 5/2019 | Madduri | .............. | G08G 1/0116 701/117 |
| 2020/0379461 A1* | 12/2020 | Singh | ................ | B60W 60/0027 |

FOREIGN PATENT DOCUMENTS

| | | | |
|---|---|---|---|
| CN | 105975915 | A | 9/2016 |
| CN | 106781458 | A | 5/2017 |
| CN | 107742418 | A | 2/2018 |
| CN | 107845262 | A | 3/2018 |
| CN | 108922188 | A | 11/2018 |
| CN | 109558969 | A | 4/2019 |
| CN | 109969172 | A | 7/2019 |
| CN | 110264711 | A | 9/2019 |
| CN | 111144485 | A | 5/2020 |
| CN | 111275957 | A | 6/2020 |
| KR | 20170065898 | A | 6/2017 |
| WO | 2018167453 | A1 | 9/2018 |
| WO | 2019145018 | A1 | 8/2019 |

OTHER PUBLICATIONS

First Office Action and Search Report from CN app. No. 202010583070. X, dated Mar. 8, 2021, with English translation from Global Dossier.

Gokasar et al., "Accident Lane Prediction Using Proabilistic Inference", 2019 6th International Conference on Models and Technologies for Intelligent Transportation Systems, Jun. 7, 2019.

Zhou, Zhengyang, "RiskOracle: A Minute-level Citywide Traffic Accident Forecasting Framework", Feb. 19, 2020.

Zhao, Xiaoqiang, "The Theory and Method of Traffic Accident Duration Forecast", Engineering Science and Technology II Series, Issue 5, pp. C034-615, May 15, 2012.

Notification to Grant Patent Right for Invention from CN app. No. 202010583070.X, dated Dec. 17, 2021, with English translation from Global Dossier, all pages.

Ghosh et al., "Accident Detection using Convolutional Neural Networks", 2019 International Conference on Data Science and Communication, IEEE, Mar. 1, 2019, all pages.

Extended European Search Report from EP app. No. 21164459.6, dated Sep. 22, 2021, all pages.

Third Office Action and Search Report from CN app. No. 202010583070.X, dated Sep. 15, 2021, with English translation from Global Dossier, all pages.

\* cited by examiner

METHOD AND APPARATUS FOR IDENTIFYING TRAFFIC ACCIDENT, DEVICE AND COMPUTER STORAGE MEDIUM

The present application claims the priority of Chinese Patent Application No. 202010583070.X, filed on Jun. 23, 2020, with the title of "Method and apparatus for identifying traffic accident, device and computer storage medium". The disclosure of the above application is incorporated herein by reference in its entirety.

FIELD OF THE DISCLOSURE

The present application relates to the technical field of computer application, and particularly to the technical fields of intelligent traffic and big data.

BACKGROUND OF THE DISCLOSURE

Traffic accidents may impact the whole traffic network, such that traffic which is smooth originally becomes congested, roads which are spacious originally become impassable, and original travel plans of users become unrealizable. Therefore, many drivers prefer taking a detour to avoid sites of the traffic accidents as far as possible. If unable to avoid the sites of the accidents, but able to learn the positions and the states of the accidents as early as possible, the drivers are able to make lane change preparation in advance, and leave the sites as quickly as possible. Therefore, a traffic-accident finding capability with strong timeliness and a high coverage rate may assist the users greatly.

SUMMARY OF THE DISCLOSURE

In view of the this, the present application is intended to provide a method and apparatus for identifying a traffic accident, a device and a computer storage medium with strong timeliness and a high coverage rate.

In a first aspect, the present application provides a method for identifying a traffic accident, including:

acquiring road features, environmental features and road traffic stream features;

inputting the road features, the environmental features and the road traffic stream features into a pre-trained traffic-accident identifying model to obtain an accident-information identifying result of a road which at least includes an accident identifying result.

In a second aspect, the present application provides a method for training a traffic-accident identifying model, including:

acquiring a first training sample from a historical traffic accident record, wherein the first training sample includes road features, environmental features and road traffic stream features of a road annotated as an accident road as a positive sample, and road features, environmental features and road traffic stream features of a road annotated as a non-accident road as a negative sample;

training the traffic-accident identifying model using the positive and negative samples, wherein the traffic-accident identifying model may obtain an accident-information identifying result of the corresponding road according to the road features, the environmental features and the road traffic stream features, and the accident-information identifying result at least includes an accident identifying result.

In a third aspect, the present application provides an electronic device, comprising:

at least one processor; and a memory communicatively connected with the at least one processor;

wherein the memory stores instructions executable by the at least one processor, and the instructions are executed by the at least one processor to enable the at least one processor to perform a method for identifying a traffic accident, wherein the method comprises:

acquiring road features, environmental features and road traffic stream features;

inputting the road features, the environmental features and the road traffic stream features into a pre-trained traffic-accident identifying model to obtain an accident-information identifying result of a road which at least includes an accident identifying result.

In a fourth aspect, the present application provides an electronic device, comprising:

at least one processor; and a memory communicatively connected with the at least one processor;

wherein the memory stores instructions executable by the at least one processor, and the instructions are executed by the at least one processor to enable the at least one processor to perform a method for training a traffic-accident identifying model, wherein the method comprises:

acquiring a first training sample from a historical traffic accident record, wherein the first training sample includes road features, environmental features and road traffic stream features of a road annotated as an accident road as a positive sample, and road features, environmental features and road traffic stream features of a road annotated as a non-accident road as a negative sample;

training the traffic-accident identifying model using the positive and negative samples, wherein the traffic-accident identifying model may obtain an accident-information identifying result of the corresponding road according to the road features, the environmental features and the road traffic stream features, and the accident-information identifying result at least includes an accident identifying result.

In a fifth aspect, the present application further provides a non-transitory computer-readable storage medium storing computer instructions therein, wherein the computer instructions are used to cause the computer to perform a method for identifying a traffic accident, wherein the method comprises:

acquiring road features, environmental features and road traffic stream features;

inputting the road features, the environmental features and the road traffic stream features into a pre-trained traffic-accident identifying model to obtain an accident-information identifying result of a road which at least comprises an accident identifying result.

In a sixth aspect, the present application further provides a non-transitory computer-readable storage medium storing computer instructions therein, wherein the computer instructions are used to cause the computer to perform a method for training a traffic-accident identifying model, wherein the method comprises:

acquiring a first training sample from a historical traffic accident record, wherein the first training sample comprises road features, environmental features and road traffic stream features of a road annotated as an accident road as a positive sample, and road features, environmental features and road traffic stream features of a road annotated as a non-accident road as a negative sample;

training the traffic-accident identifying model using the positive and negative samples, wherein the traffic-accident identifying model may obtain an accident-information identifying result of the corresponding road according to the road features, the environmental features and the road traffic stream features, and the accident-information identifying result at least comprises an accident identifying result.

According to the above technical solution, whether the accident occurs on the road or not may be automatically identified according to the road features, the environmental features and the road traffic stream features. Compared with a traditional manual reporting way, the timeliness is stronger, and the coverage rate is higher.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Most traditional traffic-accident finding ways involve human operation, and include the ways that users actively report in apps and traffic policemen upload accidents to a system of a traffic administration bureau when handling the accidents, or the like. However, the traditional traffic-accident finding ways have the following disadvantages:

1) the coverage rate is low. Not all accidents are reported by the users actively or handled by the traffic policemen, and therefore, some accidents are unable to be found.

2) the timeliness is poor. An interval may exist between the time of accident occurrence and the time when accident information is uploaded manually, and the interval time is uncertain.

3) the traffic accident information is not exhaustive. In the way of manually submitting the accident information, the users may not be willing to manually add more information, such as accident lane information, or the like, such that even if the traffic accidents are known, specific information thereof are unable to be learned.

4) the duration of congestion caused by the accidents is unable to be predicted, and assistance cannot be effectively provided for the users to plan routes.

According to the core thought of the present application, the road accident information is identified according to road features, environmental features and road traffic stream features, and the identification way breaks away from constraints of manpower, enables the users to know whether the accidents occur on each road more timely, and has a higher coverage rate and better timeliness. A method according to the present application will be described below in detail in conjunction with embodiments.

Figure 1:
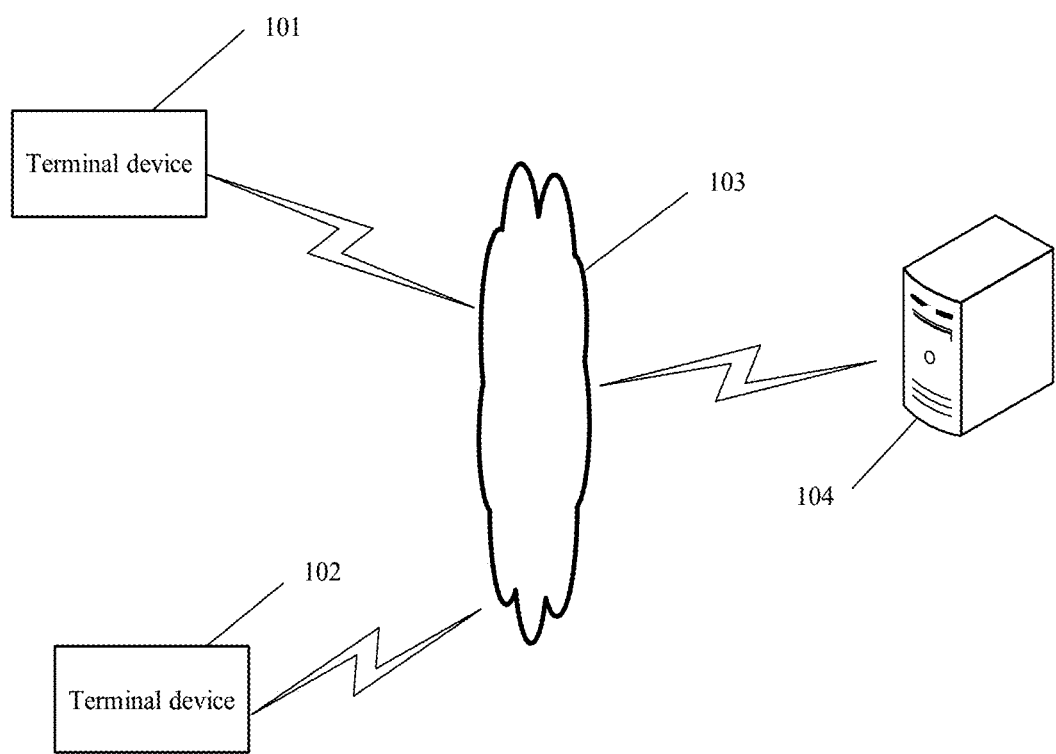
FIG. 1 shows an exemplary system architecture to which embodiments of the present disclosure may be applied.

FIG. 1 shows an exemplary system architecture to which embodiments of the present disclosure may be applied. As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a map application, a voice interaction application, a web browser application, a communication application, or the like, may be installed on the terminal devices 101, 102.

The terminal devices 101, 102 may be configured as various electronic devices able to support and present the map applications, including, but not limited to, smart phones, tablets, smart wearable devices, or the like. An apparatus according to the present disclosure may be provided and run in the above-mentioned server 104. The apparatus may be implemented as a plurality of pieces of software or a plurality of software modules (for example, for providing distributed service), or a single piece of software or a single software module, which is not specifically limited herein.

For example, the apparatus for identifying a traffic accident is provided and run in the above-mentioned server 104, and the server 104 may acquire and store various road network data, traffic flow data, or the like. The apparatus for identifying a traffic accident identifies a road with the traffic accident by using the way according to the embodiment of the present disclosure, and may issue an accident information to each terminal device 101 or 102 in time.

For another example, an apparatus for training a traffic-accident identifying model is provided and run in the above-mentioned server 104, and the server 104 may train the traffic-accident identifying model with a historical traffic accident record, such that the apparatus for identifying a traffic accident may identify the traffic accident.

The server 104 may be configured as a single server or a server group including a plurality of servers. It should be understood that the numbers of the terminal devices, the network, and the server in FIG. 1 are merely schematic.

There may be any number of terminal devices, networks and servers as desired for an implementation.

First Embodiment

Figure 2:
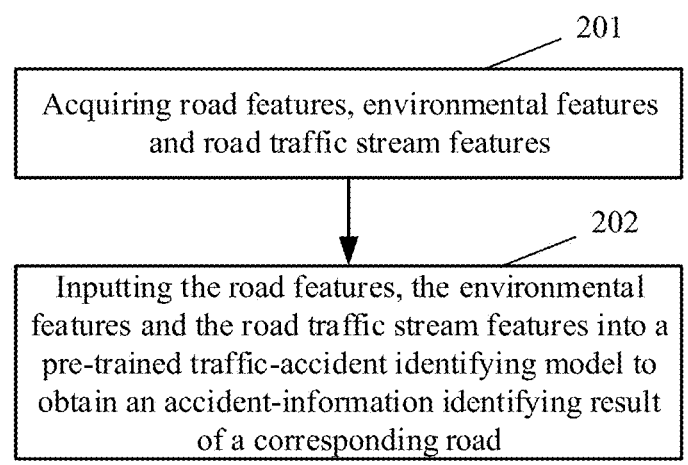
FIG. 2 is a flow chart of a main method according to a first embodiment of the present application.

FIG. 2 is a flow chart of a main method according to a first embodiment of the present application, the apparatus for identifying a traffic accident may serve as an execution subject of this embodiment, and the apparatus may be located in an application at a server side, or configured as a functional unit, such as a plug-in or software development kit (SDK) located in the application at the server side, or the like, or located in other computer systems with high computing power, which is not particularly limited in the embodiment of the present disclosure. As shown in FIG. 2, the method may include the following steps:

in 201, acquiring road features, environmental features and road traffic stream features.

The road features may include at least one of a road grade, a road speed grade, a road width grade, a road driving direction grade and a road length grade.

The environmental features may include at least one of a time feature and a weather feature.

The road traffic stream features may include at least one of a road vehicle convergence angle feature and a road traffic flow feature.

Representation of the above-mentioned various features will be described in detail in the following embodiments.

In 202, inputting the road features, the environmental features and the road traffic stream features into a pre-trained traffic-accident identifying model to obtain an accident-information identifying result of a corresponding road.

The accident-information identifying result of the road at least includes an accident identifying result, and may further include at least one of accident lane information and road congestion duration. If the duration of an accident time sequence is further predicted, in 201, traffic stream features of the area where the road is located are required to be further acquired.

In the present application, the flow in this embodiment may be performed on each road in a road network to identify traffic accident information of the road. The flow in this embodiment may also be performed on a specified road to identify the traffic accident information thereof. The flow in this embodiment may also be performed on each road in a specified area to identify the traffic accident information of the road, or the like.

The structure and the working mechanism of the traffic-accident identifying model adopted in the present application are described in detail below in conjunction with the second embodiment and the third embodiment.

Second Embodiment

Figure 3A:
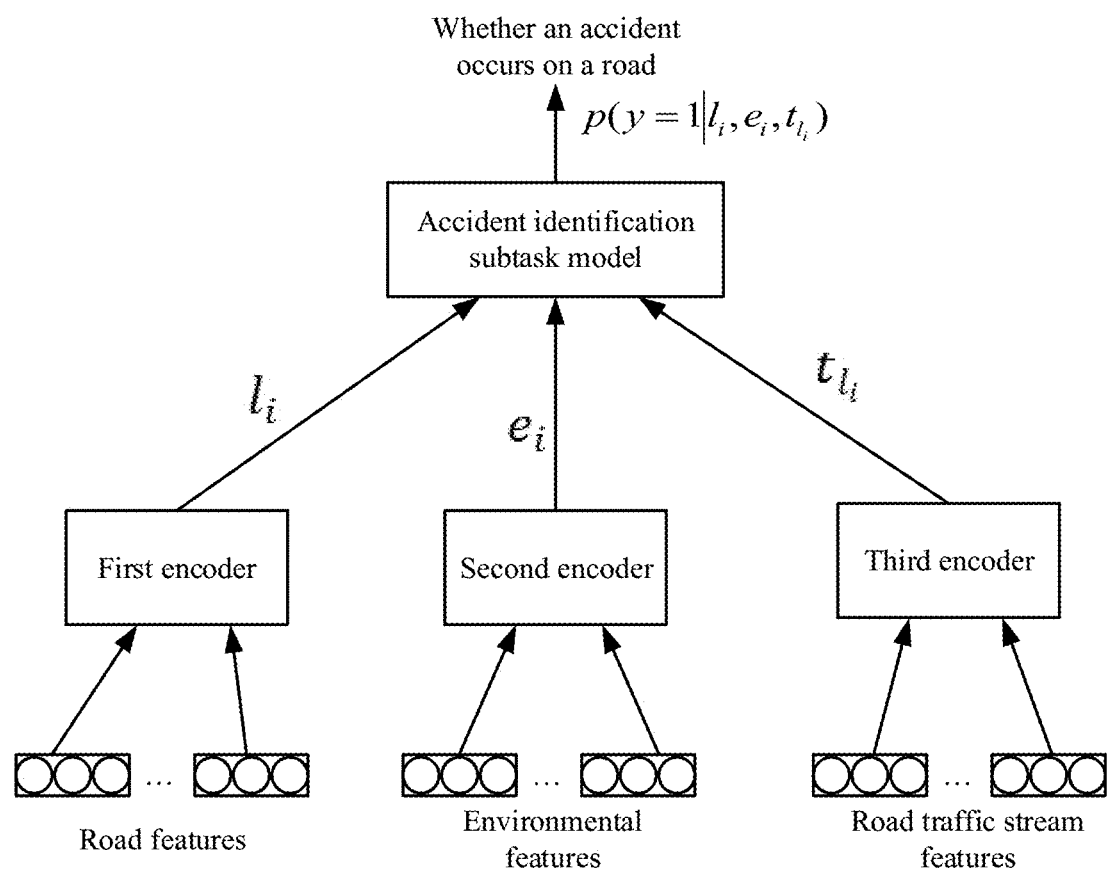
FIG. 3a is a schematic structural diagram of a traffic-accident identifying model according to a second embodiment of the present application.

FIG. 3a is a schematic structural diagram of a traffic-accident identifying model according to a second embodiment of the present application. The traffic-accident identifying model may include a first encoder, a second encoder, a third encoder and an accident identification subtask model.

The first encoder is configured to encode and map the road features to obtain vector representation thereof.

Since the road network has a huge dimension, it is difficult to collect samples of accidents on each road, and a set of roads where accidents will occur in the future may also contain cold start roads, and therefore, road feature representation is required to have a generalization capability. For a road i, in the embodiment of the present application, core features influencing a traffic capacity may be extracted, and each feature may be subjected to discretized grade representation. The road features employed may include, but are not limited to:

1) road grade. Generally, roads are graded according to administrative levels, traffic flow, or the like, and for example, graded into 10 grades from a national highway to a country road.

2) road speed grade. For example, 10 grades may be generated according to average speeds of tracks on roads.

3) road width grade. For example, 10 grades may be generated according to practical surveying and mapping widths of roads.

4) road driving direction grade. For example, road driving directions may be divided into a forward grade and a reverse grade.

5) road length grade. For example, 20 grades may be generated according to practical surveying and mapping lengths of roads.

The road features of the road i may be mapped into the above-mentioned discretized grades and spliced in sequence to obtain one-hot encoded vector representation of the road, and then, the encoded vector representation is mapped via a fully connected layer to obtain the vector representation $l_i$ of the road features.

The second encoder is configured to encode and map the environmental features to obtain vector representation thereof.

A large number of environmental factors affect a traffic capacity, and a time feature and a weather feature are taken as examples in this embodiment, but the environmental factors may be expanded to other factors.

The time feature may be continuously expressed with $$\sin\frac{2\pi(3600x+60y+z)}{86400} \text{ and } \cos\frac{2\pi(3600x+60y+z)}{86400},$$

for example, wherein x is hours, y is minutes, and z is seconds. For example, at 8:00:30 a.m., x=8, y=0 and z=30, which are substituted into the formulas to calculate two values recorded together as the time feature.

The time feature may further include a week feature, a workday feature, or the like. The week feature may be continuously expressed with $$\sin\frac{2\pi m}{7} \text{ and } \cos\frac{2\pi m}{7},$$

for example, wherein m is weeks. For example, m corresponding to Monday is 0, m corresponding to Tuesday is 1, and so on. A workday feature may be expressed in 2 dimensions, for example, 0 for workdays and 1 for legal holidays.

The weather feature may be classified into categories, such as clear weather, overcast weather, light rain, moderate rain, heavy rain, torrential rain, light snow, moderate snow, heavy snow, snowstorm, fog, or the like, and expressed in a one-hot encoding form, and finally, 30-dimensional features are obtained. Then, the features are spliced in sequence, and mapped via the fully connected layer to obtain the vector representation $e_i$ of the environmental features.

The third encoder is configured to encode and map the road traffic stream features to obtain vector representation thereof.

Since an obvious convergence phenomenon tends to occur after the traffic accident happens, and meanwhile, the traffic flow may also change obviously, the road traffic stream features adopted in the embodiment of the present application may include at least one of a road vehicle convergence angle feature and a road traffic flow feature.

Figure 4:
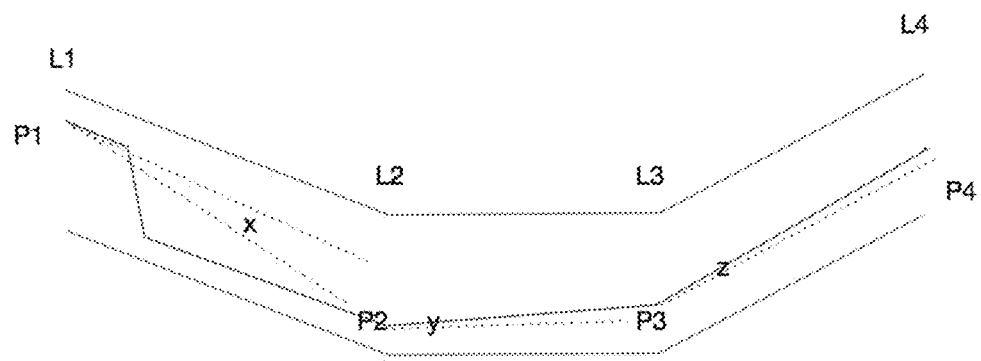
FIG. 4 is a schematic diagram of a vehicle convergence angle feature according to an embodiment of the present application.

The road vehicle convergence angle feature adopts the difference between an included angle of a vehicle speed direction (for example, average speed direction) passing through the road over a certain period of time and a road included angle. Taking FIG. 4 as an example, it is assumed that one road includes four shape points L1, L2, L3, L4. A road segment between every two adjacent shape points is linear. It is assumed that the vehicle speed direction is a polygonal line represented by four shape points P1, P2, P3, P4. An included angle of x° is formed between P1P2 and L1L2, an included angle -y° is formed between segments P2P3 and L2L3, and an included angle of -z° is formed between segments P3P4 and L3L4; the angle is positive when the vehicle speed direction is clockwise relative to the road direction, and negative when the vehicle speed direction is counterclockwise relative to the road direction. Then, the road vehicle convergence angle feature may be represented as included angle accumulation of each road segment, and for example, may be represented by two features of an arithmetic sum F1=x°+(-y°)+(-z°) and an absolute value sum F2=|x°|+|-y°|+|-z°|. Then, F1 and F2 are discretized by taking 10 degrees as a segment to obtain 72-dimensional discrete values. The discrete value in each dimension represents a normalized vehicle proportion meeting an included-angle discrete standard.

The road traffic flow feature adopts an absolute value of vehicles passing through the road for a certain period of time.

In this embodiment, the above-mentioned features may be spliced sequentially and mapped via the fully connected layer to obtain the vector representation $t_{l_i}$ of the road traffic stream features. In particular, since traffic stream is continuous, the above-mentioned certain time periods may be the last 1 minute and the last 5 minutes respectively, and then, the features counted in the last 1 minute and in the last 5 minutes are spliced sequentially and mapped via the fully connected layer to obtain the vector representation $t_{l_i}$ of the road traffic stream features.

The accident identification subtask model is configured to perform classification with the vector representation $l_i$ of the road features, the vector representation $e_i$ of the environmental features and the vector representation $t_{l_i}$ of the road traffic stream features to obtain the accident identifying result of the corresponding road. The accident identification subtask model performs a binary classification task, and if accident classification is represented as 1 and non-accident classification is represented as 0, the task may be represented as $p(y=1|l_i,e_i,t_{l_i})$. That is, the accident identification subtask model determines an accident probability of the road i according to the input vector representation $l_i$ of the road features, the input vector representation $e_i$ of the environmental features and the input vector representation $t_{l_i}$ of the road traffic stream features.

Third Embodiment

Figure 3B:
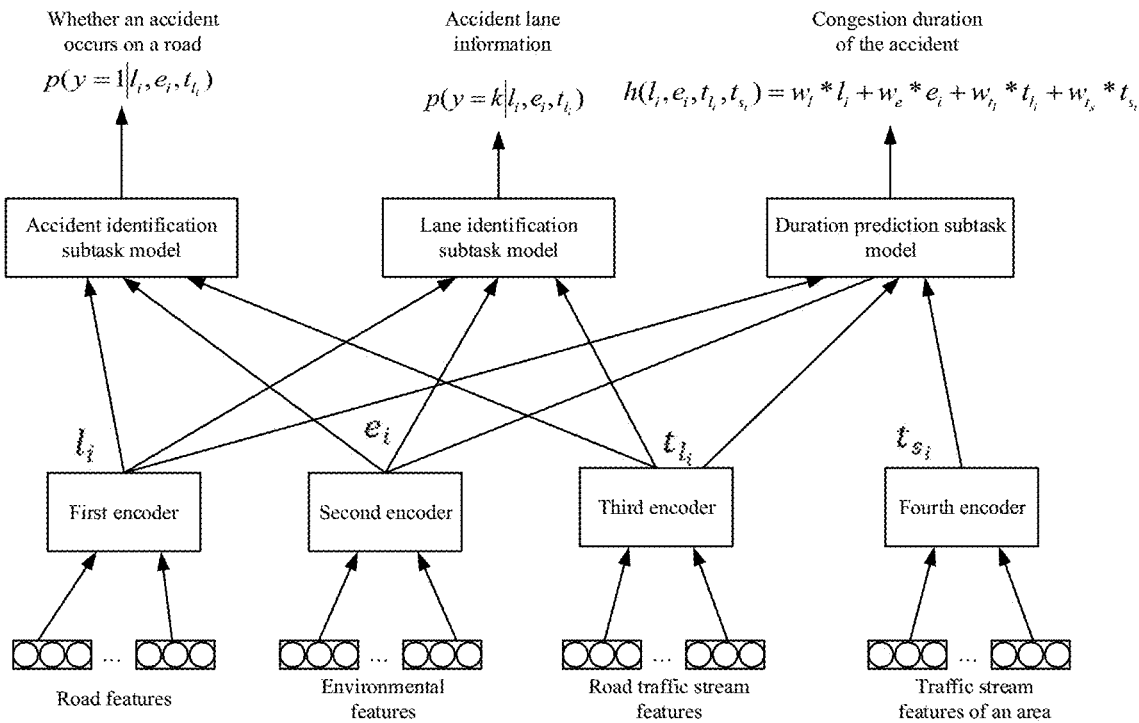
FIG. 3b is a schematic structural diagram of another traffic-accident identifying model according to a third embodiment of the present application.

FIG. 3b is a schematic structural diagram of another traffic-accident identifying model according to a third embodiment of the present application, and as shown in FIG. 3b, in addition to the first, second and third encoders as well as the accident identification subtask model, the traffic-accident identifying model may include at least one of a lane identification subtask model and a duration prediction subtask model (in this embodiment, taking including both the lane identification subtask model and the duration prediction subtask model as an example). If the duration prediction subtask model is included, the traffic-accident identifying model may further include a fourth encoder.

The functions of the first, second and third encoders as well as the accident identification subtask model are similar to those in the second embodiment, and are not repeated herein.

The difference lies in that the first, second and third encoders further output results to the lane identification subtask model and the duration prediction subtask model respectively.

The lane identification subtask model is configured to perform classification with the vector representation $l_i$ of the road features, the vector representation $e_i$ of the environmental features and the vector representation $t_{l_i}$ of the road traffic stream features to obtain the accident lane information.

The lane identification subtask model performs a multi-classification task, and lanes on the road are classified in advance, for example, into a left lane and a right lane, or a middle lane, a second lane from right to left, or the like. The task may be represented as $p(y=k|l_i,e_i,t_{l_i})$, wherein k represents the lanes; that is, the lane identification subtask model determines the probability that the accident occurs at the lane k according to the input vector representation $l_i$ of the road features, the input vector representation $e_i$ of the environmental features and the input vector representation $t_{l_i}$ of the road traffic stream features.

The fourth encoder is configured to encode and map the traffic stream features of the area where the road is located to obtain vector representation thereof. The fourth encoder outputs the result to the duration prediction subtask model.

After the traffic accident occurs, if there are vehicles planning to pass through the accident area continuously in a future period of time, congestion is worsened with a large probability and the congestion duration of the accident is prolonged. Therefore, the traffic stream features of the area are introduced in this embodiment. The traffic stream features in the area are intended to depict the traffic flow density in a certain area range, and therefore, traffic flow features of each sub-area included in the area where the road is located may be adopted. The area where the road is located may be divided according to administrative regions, or an area may be formed by extending outwards by a certain range with the road as a center point, and then divided into a fixed number of sub-areas. For example, a rectangular area of 10 km×10 km is formed by extending outwards by 5 km with the road as the center point, and divided into 100 small areas of 1 km×1 km.

Traffic flow features in the sub-area are represented by the average value of road-congestion-coefficient weighted road lengths in the sub-area:

$$I_x = \frac{\sum_j r_j^* L_j}{\sum_j L_j}$$

wherein $I_x$ is the traffic flow features in the sub-area, $L_j$ is the length of the road j in the sub-area, and $r_j$ is the congestion coefficient of the road j in the sub-area.

A matrix formed by values of the traffic flow features in each sub-area is input into a CNN (convolutional neural network), and then, a feature matrix output by the CNN is mapped via the fully connected layer to obtain the vector representation $t_{s_i}$ of the traffic stream features of the area. In addition to the CNN, other encoding models, such as GCN (graph convolutional network), or the like, may also be adopted.

The duration prediction subtask model is configured to perform regression prediction with the vector representation $l_i$ of the road features, the vector representation $e_i$ of the environmental features, the vector representation $t_{t_i}$ of the road traffic stream features and the vector representation $t_{s_i}$ of the traffic stream features of the area, so as to obtain congestion duration information of the accident on the corresponding road. The duration prediction subtask model performs a regression task which may be represented with the following formula:

$$h(l_i, e_i, t_{t_i}, t_{s_i}) = w_l * l_i + w_e * e_i + w_{t_t} * t_{t_i} + w_{t_s} * t_{s_i}$$

wherein $w_l$, $w_e$, $w_{t_t}$ and $w_{t_s}$ are model parameters.

It may be seen that the traffic-accident identifying model is actually a multi-task model, and the training process of the traffic-accident identifying model will be described in detail in conjunction with the fourth embodiment.

Fourth Embodiment

Figure 5:
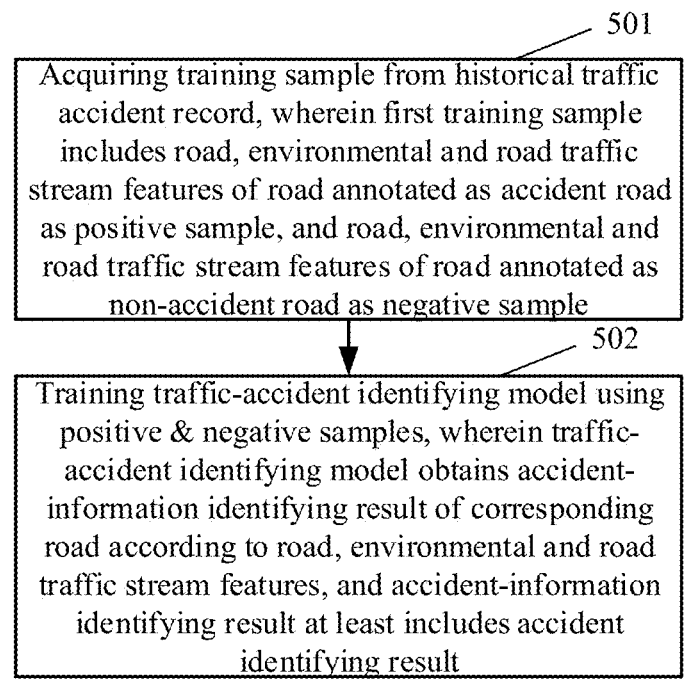
FIG. 5 is a flow chart of a method for training a traffic-accident identifying model according to a fourth embodiment of the present application.

FIG. 5 is a flow chart of a method for training a traffic-accident identifying model according to a fourth embodiment of the present application, and as shown in FIG. 5, the method may include the following steps:

in 501, acquiring a first training sample from a historical traffic accident record, wherein the first training sample includes road features, environmental features and road traffic flow features of a road annotated as an accident road as a positive sample, and road features, environmental features and road traffic flow features of a road annotated as a non-accident road as a negative sample.

The historical traffic accident record may be reported by a user, a traffic policeman or other authorities. Traffic accidents which do not generate obvious congestion or have short congestion duration are filtered out from these traffic accident records, some traffic accident records are then extracted from the high-quality traffic accidents obtained after the filtering process, the roads of these traffic accident records are annotated as accident roads, and the road features, the environmental features and the road traffic stream features are acquired from the corresponding roads to generate the positive sample. When the negative sample is constructed, some roads may be extracted from the roads annotated as the non-accident roads and annotated as accident roads, and the road features, the environmental features and the road traffic stream features are acquired from the corresponding road to generate the negative sample.

In 502, training the traffic-accident identifying model using the positive and negative samples, wherein the traffic-accident identifying model may obtain an accident-information identifying result of the corresponding road according to the road features, the environmental features and the road traffic stream features, and the accident-information identifying result at least includes an accident identifying result.

For the traffic-accident identifying model as shown in FIG. 3a, in the training process, the first encoder encodes and maps the road features in the first training sample to obtain vector representation of the road features. The second encoder encodes and maps the environmental features in the first training sample to obtain vector representation of the environmental features. The third encoder encodes and maps the road traffic stream features in the first training sample to obtain vector representation of the road traffic stream features. Then, the accident identification subtask model performs classification with the vector representation of the road features, the vector representation of the environmental features and the vector representation of the road traffic stream features to obtain the accident identifying result of the corresponding road. A training target is that the identifying result of the accident identification subtask model is consistent with corresponding annotation in the first training sample. That is, for the positive sample, a prediction target of the accident identification subtask model is occurrence of an accident, and for the negative sample, the prediction target of the accident identification subtask model is non-occurrence of an accident. A loss function may be constructed according to the training target, and model parameters of the first, second and third encoders as well as the accident identification subtask model are optimized according to the value of the loss function in each iteration.

If the traffic-accident identifying model as shown in FIG. 3b also includes a lane identification subtask model, a second training sample is required to be acquired for training the subtask model.

The second training sample is also acquired from the above-mentioned historical traffic accident record, the traffic accident record with accident lane information may be further selected from the positive sample in the first training sample, the accident lane information is annotated, and the road features, the environmental features and the road traffic stream features are acquired from the accident road as the second training sample.

Results of encoding and mapping of the second training sample by the first, second and third encoders are output to the lane identification subtask model. The lane identification subtask model performs classification with the vector representation of the road features, the vector representation of the environmental features and the vector representation of the road traffic stream features to obtain the accident lane information. A training target is that the identifying result of the lane identification subtask model is consistent with corresponding annotation in the second training sample. A loss function may be constructed according to the training target, and the model parameters of the first, second and third encoders as well as the lane identification subtask model are optimized according to the value of the loss function in each iteration.

If the model further includes a duration prediction subtask model, a third training sample is required to be acquired for training the subtask model. The third training sample is also acquired from the above-mentioned historical traffic accident record, the traffic accident record in which congestion duration information may be determined may be further selected from the positive sample in the first training sample, congestion duration is annotated, and the road features, the environmental features, the road traffic stream features and traffic stream features of an area where the road is located are acquired from the accident road as the third training sample.

Except that the above-mentioned first, second and third encoders encode and map the third training sample respectively and output results to the duration prediction subtask model, the fourth encoder encodes and maps the traffic stream features of the area where the road is located in the third training sample, so as to obtain vector representation of the area traffic stream features and output the vector representation to the duration prediction subtask model.

The duration prediction subtask model performs regression prediction with the vector representation of the road features, the vector representation of the environmental features, the vector representation of the road traffic stream features and the vector representation of the traffic stream features of the area, so as to obtain congestion duration information of the accident on the corresponding road. A training target is that a prediction result of the duration prediction subtask model is consistent with corresponding annotation in the third training sample. A loss function may be constructed with the training target, for example, the difference between the prediction result of the duration prediction subtask model and the corresponding annotation in the third training sample. The model parameters of the first, second, third and fourth encoders as well as the duration prediction subtask model are optimized according to the value of the loss function in each iteration.

The training process of the traffic-accident identifying model shown in FIG. 3b is a multi-task training process. The three subtask models share the first, second and third encoders. Since the orders of magnitude of the samples (i.e., the second training samples) with the accident lane information and the samples (i.e., the third training samples) with the congestion duration are much lower than the number of the accident samples (i.e., the first training samples), the training accuracy of the lane identification subtask model and the duration prediction subtask model may be effectively improved by a shared layer (the first, second and third encoders) by means of the multi-task learning process.

The traffic-accident identifying model shown in FIG. 3b includes more than two subtask models, and one subtask model and the training samples corresponding thereto may be selected for training in each iteration of training until the training target of each subtask model is reached.

When one subtask model and the training samples corresponding thereto are selected for training in each iteration of training, the subtask model may be selected randomly or alternatively, and then, training samples are extracted randomly or sequentially from the training samples corresponding to the selected subtask model.

For example, firstly, training samples are randomly extracted from the first training samples, and the model parameters of the first, second and third encoders as well as the accident identification subtask model are updated using the loss function output by the accident identification subtask model. Then, training samples are randomly extracted from the second training samples, and the model parameters of the first, second and third encoders as well as the lane identification subtask model are updated using the loss function output by the lane identification subtask model. Next, training samples are randomly extracted from the third training samples, and the model parameters of the first, second, third and fourth encoders as well as the duration prediction subtask model are updated using the loss function output of the duration prediction subtask model. The process is repeated until an iteration termination condition is met. For example, the iteration termination condition may include: the loss functions of all the subtask models are converged, the number of iterations reaches a preset iteration number threshold, all the training samples are trained, or the like.

The above is a detailed description of the method according to the present application. An apparatus according to the present application will be described below in detail in conjunction with embodiments.

Fifth Embodiment

Figure 6:
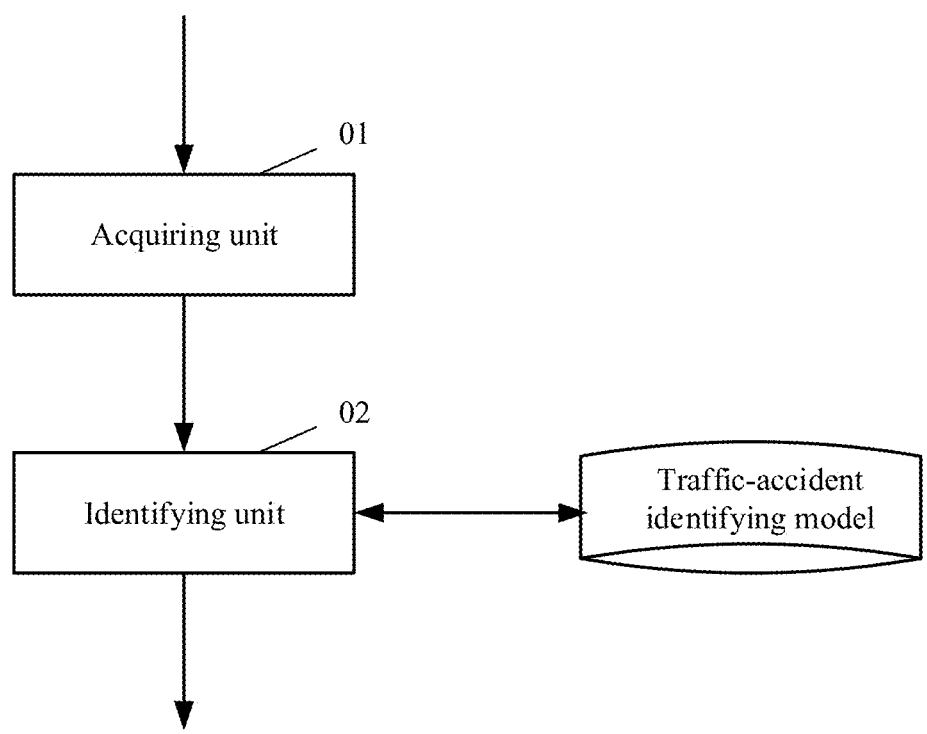
FIG. 6 is a structural diagram of an apparatus for identifying a traffic accident according to a fifth embodiment of the present application.

FIG. 6 is a structural diagram of an apparatus for identifying a traffic accident according to a fifth embodiment of the present application, and as shown in FIG. 6, the apparatus may include an acquiring unit 01 and an identifying unit 02. The main functions of each constitutional unit are as follows.

The acquiring unit 01 is configured to acquire road features, environmental features and road traffic stream features.

The road features include at least one of a road grade, a road speed grade, a road width grade, a road driving direction grade and a road length grade;

the environmental features include at least one of a time feature and a weather feature;

the road traffic stream features include at least one of a road vehicle convergence angle feature and a road traffic flow feature, and the vehicle convergence angle feature is obtained by the difference between an included angle of a vehicle speed direction on a road and a road included angle.

The identifying unit 02 is configured to input the road features, the environmental features and the road traffic stream features into a pre-trained traffic-accident identifying model to obtain an accident-information identifying result of a road which at least includes an accident identifying result.

As shown in FIG. 3a, the traffic-accident identifying model may include a first encoder, a second encoder, a third encoder and an accident identification subtask model.

The first encoder is configured to encode and map the road features to obtain vector representation thereof.

The second encoder is configured to encode and map the environmental features to obtain vector representation thereof.

The third encoder is configured to encode and map the road traffic stream features to obtain vector representation thereof.

The accident identification subtask model is configured to perform classification with the vector representation of the road features, the vector representation of the environmental features and the vector representation of the road traffic stream features to obtain the accident identifying result of the road.

Further, as shown in FIG. 3b, the traffic-accident identifying model may further include:

a lane identification subtask model configured to perform classification with the vector representation of the road features, the vector representation of the environmental features and the vector representation of the road traffic stream features to obtain the accident lane information.

Further, the traffic-accident identifying model may further include:

a fourth encoder configured to encode and map traffic stream features of an area where the road is located to obtain vector representation thereof;

wherein the traffic stream features of the area where the road is located include traffic flow features of each sub-area included in the area, and the traffic flow features are represented by the average value of road-congestion-coefficient weighted road lengths in the sub-area; and a duration prediction subtask model for performing regression prediction with the vector representation of the road features, the vector representation of the environmental features, the vector representation of the road traffic stream features and the vector representation of the traffic stream features of the area, so as to obtain congestion duration information of the accident on the road.

Sixth Embodiment

Figure 7:
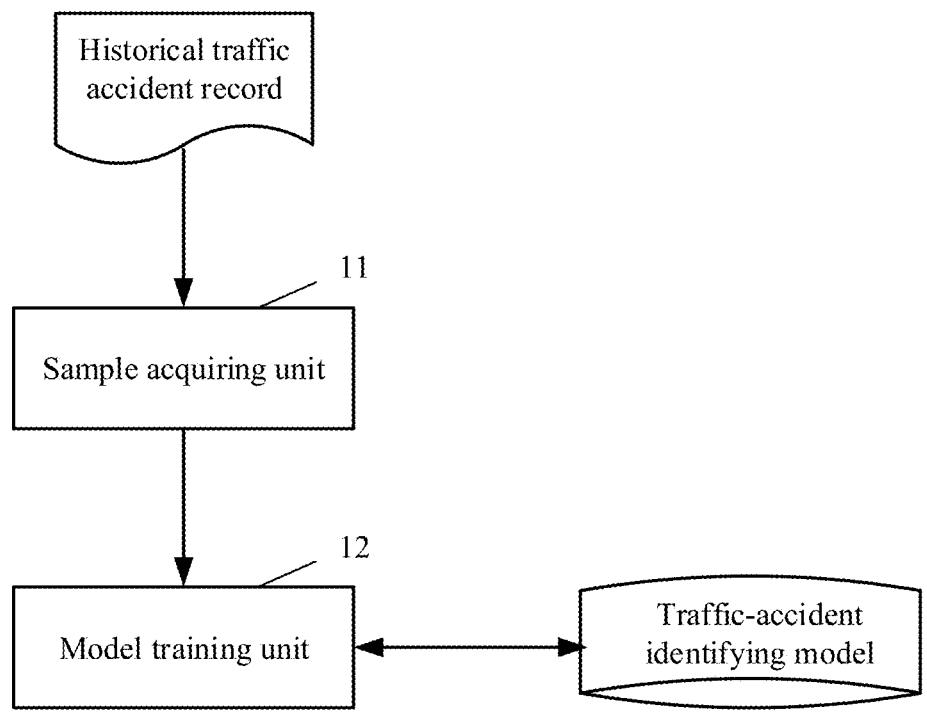
FIG. 7 is a structural diagram of an apparatus for training a traffic-accident identifying model according to a sixth embodiment of the present application.

FIG. 7 is a structural diagram of an apparatus for training a traffic-accident identifying model according to a sixth embodiment of the present application, and as shown in FIG. 7, the apparatus may include a sample acquiring unit 11 and a model training unit 12. The main functions of each constitutional unit are as follows.

The sample acquiring unit 11 is configured to acquire a first training sample from a historical traffic accident record, wherein the first training sample includes road features, environmental features and road traffic stream features of a road annotated as an accident road as a positive sample, and road features, environmental features and road traffic stream features of a road annotated as a non-accident road as a negative sample.

The road features include at least one of a road grade, a road speed grade, a road width grade, a road driving direction grade and a road length grade;

the environmental features include at least one of a time feature and a weather feature;

the road traffic stream features include at least one of a road vehicle convergence angle feature and a road traffic flow feature, and the vehicle convergence angle feature is obtained by the difference between an included angle of a vehicle speed direction on a road and a road included angle.

The sample training unit 12 is configured to train the traffic-accident identifying model using the positive and negative samples, wherein the traffic-accident identifying model may obtain an accident-information identifying result of the corresponding road according to the road features, the environmental features and the road traffic stream features, and the accident-information identifying result at least includes an accident identifying result.

As shown in FIG. 3a, the traffic-accident identifying model may include a first encoder, a second encoder, a third encoder and an accident identification subtask model.

The first encoder is configured to encode and map the road features to obtain vector representation thereof.

The second encoder is configured to encode and map the environmental features to obtain vector representation thereof.

The third encoder is configured to encode and map the road traffic stream features to obtain vector representation thereof.

The accident identification subtask model is configured to perform classification with the vector representation of the road features, the vector representation of the environmental features and the vector representation of the road traffic stream features to obtain the accident identifying result of the corresponding road.

At this moment, the model training unit 12 trains the first, second and third encoders as well as the accident identification subtask model with the first training sample, and a training target is that the identifying result of the accident identification subtask model is consistent with corresponding annotation in the first training sample.

As shown in FIG. 3b, the traffic-accident identifying model may further include a lane identification subtask model.

Then, the sample acquiring unit 11 is further configured to acquire a second training sample from the historical traffic accident record, wherein the second training sample includes the road features, the environmental features and the road traffic stream features of the accident road as well as annotation of accident lane information.

The lane identification subtask model is configured to perform classification with the vector representation of the road features, the vector representation of the environmental features and the vector representation of the road traffic stream features to obtain the accident lane information.

The model training unit 12 is further configured to train the first, second and third encoders as well as the lane identification subtask model with the second training sample, and a training target is that the classification result of the lane identification subtask model is consistent with the corresponding annotation in the second training sample.

As shown in FIG. 3b, the traffic-accident identifying model may further include a fourth encoder and a duration prediction subtask model.

Then, the sample acquiring unit 11 is further configured to acquire a third training sample from the historical traffic accident record, wherein the third training sample includes the road features, the environmental features and the road traffic stream features of the accident road, traffic stream features of an area where the road is located as well as annotation of congestion duration information of an accident.

The fourth encoder is configured to encode and map traffic stream features of an area where the road is located to obtain vector representation thereof.

The traffic stream features of the area where the road is located include traffic flow features of each sub-area included in the area. The traffic flow features are represented by the average value of road-congestion-coefficient weighted road lengths in the sub-area.

The duration prediction subtask model is configured to perform regression prediction with the vector representation of the road features, the vector representation of the environmental features, the vector representation of the road traffic stream features and the vector representation of the traffic stream features of the area, so as to obtain congestion duration information of the accident on the corresponding road.

The model training unit 12 may train the first, second, third and fourth encoders as well as the duration prediction subtask model with the third training sample, and a training target is that the prediction result of the duration prediction subtask model is consistent with the corresponding annotation in the third training sample.

If the traffic-accident identifying model includes more than two subtask models, the model training unit 12 selects one subtask model and the training samples corresponding thereto for training in each iteration of training until the training target of each subtask model is reached.

As a preferred embodiment, when selecting one subtask model and the training samples corresponding thereto for training in each iteration of training, the model training unit 12 is specifically configured to randomly or alternatively select the subtask model, and then randomly or sequentially extract training samples from the training samples corresponding to the selected subtask model.

According to the embodiments of the present application, there are also provided an electronic device and a readable storage medium.

Figure 8:
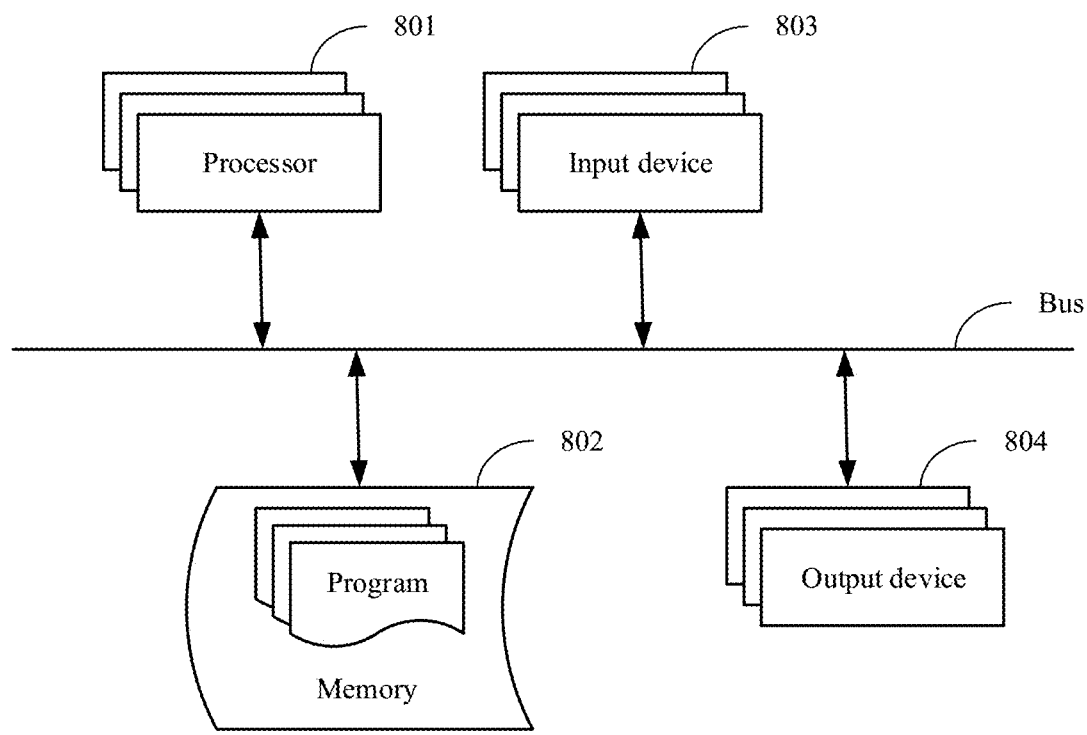
FIG. 8 is a block diagram of an electronic device configured to implement the method according to the embodiments of the present application.

FIG. 8 is a block diagram of an electronic device for implementing the method for identifying a traffic accident and the method for training a traffic-accident identifying model according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 8, the electronic device includes one or more processors 801, a memory 802, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 8, one processor 801 is taken as an example.

The memory 802 is configured as the non-transitory computer readable storage medium according to the present application. The memory stores instructions executable by the at least one processor to cause the at least one processor to perform the method for identifying a traffic accident and the method for training a traffic-accident identifying model according to the present application. The non-transitory computer readable storage medium according to the present application stores computer instructions for causing a computer to perform the method for identifying a traffic accident and the method for training a traffic-accident identifying model according to the present application.

The memory 802 which is a non-transitory computer readable storage medium may be configured to store non-transitory software programs, non-transitory computer executable programs and modules, such as program instructions/modules corresponding to the method for identifying a traffic accident and the method for training a traffic-accident identifying model according to the embodiments of the present application. The processor 801 executes various functional applications and data processing of a server, that is, implements the method for identifying a traffic accident and the method for training a traffic-accident identifying model according to the above-mentioned embodiments, by running the non-transitory software programs, instructions, and modules stored in the memory 802.

The memory 802 may include a program storage area and a data storage area, wherein the program storage area may store an operating system and an application program required for at least one function; the data storage area may store data created according to use of the electronic device, or the like. Furthermore, the memory 802 may include a high-speed random access memory, or a non-transitory memory, such as at least one magnetic disk storage device, a flash memory device, or other non-transitory solid state storage devices. In some embodiments, optionally, the memory 802 may include memories remote from the processor 801, and such remote memories may be connected to the electronic device via a network. Examples of such a network include, but are not limited to, the Internet, intranets, local area networks, mobile communication networks, and combinations thereof.

The electronic device may further include an input device 803 and an output device 804. The processor 801, the memory 802, the input device 803 and the output device 804 may be connected by a bus or other means, and FIG. 8 takes the connection by a bus as an example.

The input device 803 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output device 804 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network).

Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

From the foregoing description, the method and apparatus, the device as well as the computer storage medium according to the embodiments of the present application may have the following advantages.

1) The accident road may be automatically identified according to the road features, the environmental features and the road traffic stream features. Compared with the traditional manual reporting way, the timeliness is stronger, and the coverage rate is higher.

2) In addition to the road accident identification result, the accident lane information may be identified, such that the users acquire accident information which is more detailed and change lanes as early as possible to avoid the accident lane.

3) In the present application, the congestion duration of the accident may also be predicted, and assistance may be effectively provided for the users to plan routes.

4) In the present application, multidimensional generalized feature information which may accurately reflect influences caused by the accidents on the roads, such that the traffic accident information is more accurately identified.

5) In the present application, the traffic-accident identifying model may be trained with the historical traffic accident record, such that the traffic-accident identifying model may identify and predict the accident road, the lane information and the congestion duration mentioned above.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for identifying a traffic accident, comprising:
acquiring road features, environmental features and road traffic stream features;
inputting the road features, the environmental features and the road traffic stream features into a pre-trained traffic-accident identifying model to obtain an accident-information identifying result of a road which at least comprises an accident identifying result,
wherein the traffic-accident identifying model encodes and maps the road features, the environmental features and the road traffic stream features by using a first encoder, a second encoder and a third encoder to obtain vector representation of the road features, vector representation of the environmental features and vector representation of the road traffic stream features;
an accident identification subtask model in the traffic-accident identifying model performs classification with the vector representation of the road features, the vector representation of the environmental features and the vector representation of the road traffic stream features to obtain the accident identifying result of the road.

2. The method according to claim 1, wherein the accident-information identifying result further comprises accident lane information;
the method further comprises:
performing, by a lane identification subtask model in the traffic-accident identifying model, classification with the vector representation of the road features, the vector representation of the environmental features and the vector representation of the road traffic stream features to obtain the accident lane information.

3. The method according to claim 1, further comprising:
acquiring traffic stream features of an area where the road is located;
wherein the accident-information identifying result further comprises congestion duration information of the accident on the road;
the traffic-accident identifying module further encodes and maps the traffic stream features of the area where the load is located to obtain vector representation of the traffic stream features of the area; the duration prediction subtask model in the traffic-accident identifying module performs regression prediction with the vector representation of the road features, the vector representation of the environmental features, the vector representation of the road traffic stream features and the vector representation of the traffic stream features of the area, so as to obtain the congestion duration information of the accident on the road.

4. The method according to claim 1, wherein the road features comprise at least one of a road grade, a road speed grade, a road width grade, a road driving direction grade and a road length grade;
the environmental features comprise at least one of a time feature and a weather feature;
the road traffic stream features comprise at least one of a road vehicle convergence angle feature and a road traffic flow feature, and the vehicle convergence angle feature is obtained by the difference between an comprised angle of a vehicle speed direction on a road and a road comprised angle.

5. The method according to claim 3, wherein the traffic stream features of the area where the road is located comprise traffic flow features of each sub-area comprised in the area;
the traffic flow features are represented by the average value of road-congestion-coefficient weighted road lengths in the sub-area.

6. A method for training a traffic-accident identifying model, comprising:
acquiring a first training sample from a historical traffic accident record, wherein the first training sample comprises road features, environmental features and road traffic stream features of a road annotated as an accident road as a positive sample, and road features, environmental features and road traffic stream features of a road annotated as a non-accident road as a negative sample;
training the traffic-accident identifying model using the positive and negative samples, wherein the traffic-accident identifying model may obtain an accident-information identifying result of the corresponding road according to the road features, the environmental features and the road traffic stream features, and the accident-information identifying result at least comprises an accident identifying result, wherein the traffic-accident identifying model comprises a first encoder, a second encoder, a third encoder and an accident identification subtask model;

the first encoder is configured to encode and map the road features to obtain vector representation thereof;

the second encoder is configured to encode and map the environmental features to obtain vector representation thereof;

the third encoder is configured to encode and map the road traffic stream features to obtain vector representation thereof; and the accident identification subtask model is configured to perform classification with the vector representation of the road features, the vector representation of the environmental features and the vector representation of the road traffic stream features to obtain the accident identifying result of the corresponding road;

the first, second and third encoders as well as the accident identification subtask model are trained with the first training sample, and a training target is that the identifying result of the accident identification subtask model is consistent with corresponding annotation in the first training sample.

7. The method according to claim 6, further comprising:
acquiring a second training sample from the historical traffic accident record, wherein the second training sample comprises the road features, the environmental features and the road traffic stream features of the accident road as well as annotation of accident lane information;

wherein the traffic-accident identifying model further comprises a lane identification subtask model;

the lane identification subtask model is configured to perform classification with the vector representation of the road features, the vector representation of the environmental features and the vector representation of the road traffic stream features to obtain the accident lane information;

the first, second and third encoders as well as the lane identification subtask model are trained with the second training sample, and a training target is that the classification result of the lane identification subtask model is consistent with the corresponding annotation in the second training sample.

8. The method according to claim 6, further comprising:
acquiring a third training sample from the historical traffic accident record, wherein the third training sample comprises the road features, the environmental features and the road traffic stream features of the accident road, traffic stream features of an area where the road is located as well as annotation of congestion duration information of an accident;

wherein the traffic-accident identifying model further comprises a fourth encoder and a duration prediction subtask model;

the fourth encoder is configured to encode and map traffic stream features of an area where the road is located to obtain vector representation thereof;

the duration prediction subtask model is configured to perform regression prediction with the vector representation of the road features, the vector representation of the environmental features, the vector representation of the road traffic stream features and the vector representation of the traffic stream features of the area, so as to obtain congestion duration information of the accident on the corresponding road;

the first, second, third and fourth encoders as well as the duration prediction subtask model are trained with the third training sample, and a training target is that the prediction result of the duration prediction subtask model is consistent with the corresponding annotation in the third training sample.

9. The method according to claim 7, wherein if the traffic-accident identifying model comprises more than two subtask models, one subtask model and the training samples corresponding thereto are selected for training in each iteration of training until the training target of each subtask model is reached.

10. The method according to claim 9, wherein when one subtask model and the training samples corresponding thereto are selected for training in each iteration of training, the subtask model are selected randomly or alternatively, and then, training samples are extracted randomly or sequentially from the training samples corresponding to the selected subtask model.

11. The method according to claim 6, wherein the road features comprise at least one of a road grade, a road speed grade, a road width grade, a road driving direction grade and a road length grade;

the environmental features comprise at least one of a time feature and a weather feature;

the road traffic stream features comprise at least one of a road vehicle convergence angle feature and a road traffic flow feature, and the vehicle convergence angle feature is obtained by the difference between an comprised angle of a vehicle speed direction on a road and a road comprised angle.

12. The method according to claim 8, wherein the traffic stream features of the area where the road is located comprise traffic flow features of each sub-area comprised in the area;

the traffic flow features are represented by the average value of road-congestion-coefficient weighted road lengths in the sub-area.

13. An electronic device, comprising:
at least one processor; and
a memory communicatively connected with the at least one processor;

wherein the memory stores instructions executable by the at least one processor, and the instructions are executed by the at least one processor to enable the at least one processor to perform a method for identifying a traffic accident, wherein the method comprises:

acquiring road features, environmental features and road traffic stream features;

inputting the road features, the environmental features and the road traffic stream features into a pre-trained traffic-accident identifying model to obtain an accident-information identifying result of a road which at least comprises an accident identifying result, wherein the traffic-accident identifying model encodes and maps the road features, the environmental features and the road traffic stream features by using a first encoder, a second encoder and a third encoder to obtain vector representation of the road features, vector representation of the environmental features and vector representation of the road traffic stream features;

an accident identification subtask model in the traffic-accident identifying model performs classification with the vector representation of the road features, the vector representation of the environmental features and the vector representation of the road traffic stream features to obtain the accident identifying result of the road.

14. An electronic device, comprising:
at least one processor; and
a memory communicatively connected with the at least one processor;
wherein the memory stores instructions executable by the at least one processor, and the instructions are executed by the at least one processor to enable the at least one processor to perform a method for training a traffic-accident identifying model, wherein the method comprises:
acquiring a first training sample from a historical traffic accident record, wherein the first training sample comprises road features, environmental features and road traffic stream features of a road annotated as an accident road as a positive sample, and road features, environmental features and road traffic stream features of a road annotated as a non-accident road as a negative sample;
training the traffic-accident identifying model using the positive and negative samples, wherein the traffic-accident identifying model may obtain an accident-information identifying result of the corresponding road according to the road features, the environmental features and the road traffic stream features, and the accident-information identifying result at least comprises an accident identifying result,
wherein the traffic-accident identifying model comprises a first encoder, a second encoder, a third encoder and an accident identification subtask model;
the first encoder is configured to encode and map the road features to obtain vector representation thereof;
the second encoder is configured to encode and map the environmental features to obtain vector representation thereof;
the third encoder is configured to encode and map the road traffic stream features to obtain vector representation thereof; and
the accident identification subtask model is configured to perform classification with the vector representation of the road features, the vector representation of the environmental features and the vector representation of the road traffic stream features to obtain the accident identifying result of the corresponding road;
the first, second and third encoders as well as the accident identification subtask model are trained with the first training sample, and a training target is that the identifying result of the accident identification subtask model is consistent with corresponding annotation in the first training sample.

15. A non-transitory computer-readable storage medium storing computer instructions therein, wherein the computer instructions are used to cause the computer to perform a method according to claim 1.

16. A non-transitory computer-readable storage medium storing computer instructions therein, wherein the computer instructions are used to cause the computer to perform a method according to claim 6.

* * * * *